United States Patent [19]

Borod

[11] Patent Number: 5,265,358
[45] Date of Patent: Nov. 30, 1993

[54] PICTURE FRAME CORNER CONNECTOR

[76] Inventor: Murray Borod, 3723 Parker Hill Rd., Santa Rosa, Calif. 95404

[21] Appl. No.: 985,261

[22] Filed: Dec. 3, 1992

Related U.S. Application Data

[63] Continuation-in-part of Ser. No. 929,138, Aug. 13, 1992.

[51] Int. Cl.⁵ .............................................. A47G 1/10
[52] U.S. Cl. ...................................... 40/155; 403/402
[58] Field of Search .............. 40/155, 152, 154, 152.1; 403/402, 403

[56] References Cited

U.S. PATENT DOCUMENTS

| | | | |
|---|---|---|---|
| 3,514,886 | 6/1970 | Drakord | 40/155 |
| 4,348,127 | 8/1982 | Hays, Jr. | |
| 4,348,826 | 9/1982 | Reim | |
| 4,676,686 | 6/1987 | Eisenloffel | |
| 5,058,297 | 10/1991 | McGinnis | |

FOREIGN PATENT DOCUMENTS

| | | | |
|---|---|---|---|
| 1157644 | 11/1983 | Canada | 40/155 |
| 2647884 | 4/1978 | Fed. Rep. of Germany | |
| 3141378 | 5/1983 | Fed. Rep. of Germany | 40/155 |

*Primary Examiner*—James R. Brittain
*Assistant Examiner*—C. Hope Davis
*Attorney, Agent, or Firm*—Richard C. Litman

[57] ABSTRACT

A corner connector for securing two picture frame channel members abutted in solid, right angle relation. Each of two legs of the corner connector is disposed at right angle to one another, and has grooves to engage the end of one frame channel member. Each leg supports one or more resiliently biased projections bearing against a frame channel member inserted therein. The projections are angled so as to be pushed aside by a channel member being inserted into the corner connector, but to bind against the channel member when the channel member is withdrawn. The projections are accessible through an orifice in the rear of the corner connector. The connector is generally triangular, a third side of the triangle being formed by a panel spanning the right angle defined between the two legs. The edge of the third side has a sawtooth configuration to enable adjustable mounting of the corner connector on a nail or the like, to thereby hang the picture frame assembly on a wall when two upper corners of the assembled picture frame are so suspended.

7 Claims, 2 Drawing Sheets

PICTURE FRAME CORNER CONNECTOR

CROSS REFERENCE TO RELATED APPLICATION

This is a continuation-in-part of U.S. patent application Ser. No. 07/929,138, filed on Aug. 13, 1992.

BACKGROUND OF THE INVENTION

1. Field of the Invention

The present invention relates to readily hand assembled picture frames, and more particularly to a frame corner member which holds extruded frame pieces together by wedging action. Four such frame corner members are used in conjunction with four sections of extruded frame channels to assembled a frame.

2. Description of the Prior Art

Many improvements to the state of the art of readily assembled picture frames providing corner pieces which engage extruded frame members have been proposed.

U.S. Pat. No. 5,058,297, issued to Michael J. McGinnis on Oct. 22, 1991, provides a triangular, single piece corner fitting which surroundably receives two extruded frame pieces. Each frame piece has a notch defined therein to receive a locking arm which is biased to protrude into, and engage, the notch. A manually operated release tab is accessible from the rear.

In several prior inventions, a member holding extruded frame pieces in abutment at a right angle is provided, the member having a projection engaging corresponding apertures or notches in each frame piece. Representative are U.S. Pat. Nos. 4,348,127, issued to George O. Hays, Jr., on Sep. 7, 1982; 4,348,826, issued to Paul Reim on Sep. 14, 1982; 4,676,686, issued to Adolf Eisenloffel on Jun. 30, 1987, and West German Pat. No. 2647884, issued to Benno Barz on Apr. 27, 1978.

These inventions generally rely upon a separate resilient member favoring a bias to engage, or maintain engagement between, the associated corner member and frame pieces. This separate member, or other separate members which may be present, increase costs of manufacture, as well as complicating assembly. Also, the cooperating notch or aperture entails a cost of its own.

None of the above inventions and patents, taken either singly or in combination, is seen to describe the instant invention as claimed.

SUMMARY OF THE INVENTION

The present invention provides a generally triangular corner connector which receives bevel cut, extruded frame members. One or more locking arms are disposed at such an angle as to protrude into the path of a frame member being slid into a cooperating groove in the corner connector. The locking arm or arms resiliently yield to allow the frame member to pass by, an end surface of the locking arm or arms being biased to bear against the smooth wall of the frame member.

An attempt to withdraw the frame member (thus disassembling the frame) exerts a compressive force on the locking arm or arms, this being a consequence of the geometric arrangement of the locking arm. The locking arm or arms thus positively lock the frame member in place without reliance on precision of parts and tolerances.

Ready release means is provided by moving the locking arm out of engagement with the frame member. The frame member is now easily withdrawn.

The corner connector comprises three legs defining a triangle, with the center of the triangle being open. A sawtooth edge on the hypotenuse of the triangle allows the assembled frame to be suspended from nails which are customarily driven into a supporting environmental surface, such as a wall.

The corner connector of the present invention is made as a unitary piece, preferably from plastic, so as to eliminate complicated, multipart construction. The corner connector permits ready hand assembly of a picture frame. It is compact, strong, inexpensive, and requires neither partial disassembly nor tools to release the frame member for frame disassembly.

Accordingly, it is a principal object of the invention to provide a picture frame corner connector which rigidly retains two extruded frame members in tight abutment at a right angle to one another.

It is another object of the invention to enable ready assembly of a picture frame without tools.

It is a further object of the invention to enable ready disassembly of a picture frame without tools.

Still another object of the invention is to provide a corner connector comprising a single part.

A further object of the invention is to provide a corner connector which securely retains frame members thereto without requiring notches or apertures to be formed in the frame members.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
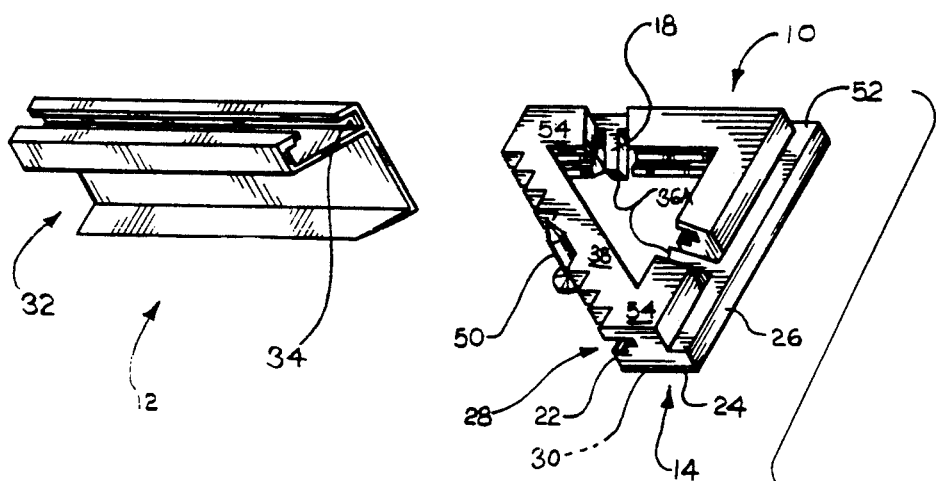
FIG. 1 is an exploded perspective detail view of a corner connector, viewed from the rear.
Figure 2:
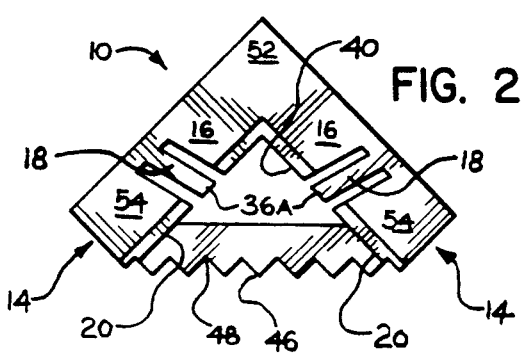
FIG. 2 is a front top plan view of the corner connector.

The present invention is seen generally in FIG. 1 to comprise a generally triangular corner connector 10 which insertably receives picture frame channels 12. A picture frame channel 12 penetrates the corner connector 10 until interference ensues with an adjacent picture frame channel 12. The corner connector 10 is bilaterally symmetrical. Referring particularly to FIG. 2, it will be seen that each of two legs 14 disposed normal to one another has a flat upper surface 16, and defines a projecting locking arm 18. This locking arm 18 normally projects beyond an inner edge 20 of each leg 14.

Referring again to FIG. 1, one leg 14 is seen to have inner and outer shoulders 22, 24. The outer shoulder 24 forms a ledge on the outside edge 26 of the corner connector 10. The inner shoulder 22 defines a groove 28 between this inner shoulder 22 and a leg rear surface 30. The grooves 28 thus defined and inner and outer shoulders 22,24 slidably receive cooperating picture frame channel members 12. As illustrated, picture frame channel 12 surrounds these shoulders 22,24; however, the precise relationship between any one leg 14 and picture frame channel 12 may be modified as desired, as long as picture frame channel 12 slidingly engages the corner connector 10. The sliding interfit thus described will hereinafter be referred to engaging retainment, and grooves 28 will be understood to encompass any surface configuration which results in at least two surfaces providing gripping surface for picture frame channel 12.

The picture frame channel 12 defines a main channel 32 to hold artwork (not shown) as well as structure engaging the corner connectors 10. Artwork, matting, and the like (not shown) are supported in and entrapped by the main channel 32.

The locking arm 18, made from resilient material, is formed integrally with the corner connector 10, and is disposed at an angle almost perpendicular to the path of the picture frame channel 12. As the picture frame channel 12 advances along grooves 28 during assembly of the picture frame (not shown assembled), it pushes the locking arm 18 out of interference. The locking arm 18 yields, but the resilience of the material biases the locking arm 18 to bear against a smooth surface 34 of the picture frame channel 12. A locking arm end surface 36 is thus maintained in close contact abutting the picture frame channel 12.

A pull on the picture frame channel 12 will exert a compressive force on the locking arm 18, thus causing the locking arm 18 to bind against the picture frame channel 12. The picture frame channel 12 is thus frictionally locked in place in the corner connector 10.

This arrangement is an improvement over prior art corner connectors, which typically provide a projection (corresponding to the locking arm 18 of the present invention) engaging a notch or orifice formed in the picture frame channel. This improvement eliminates both the notch or orifice, and the attendant precision with which such a notch or orifice must be located with respect to the beveled end of the prior art picture frame channel.

Figure 6:
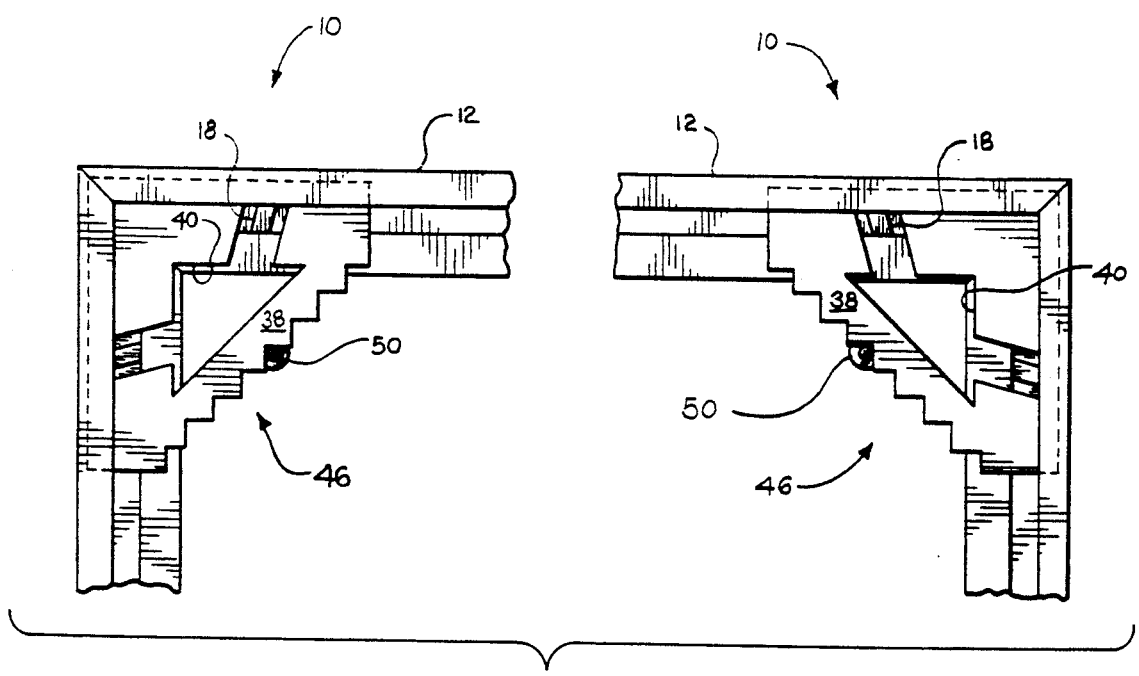
FIG. 6 is an environmental top rear plan view of two corner connectors forming the upper part of an assembled picture frame.

A third leg 38 spans and connects to both legs 14,14, thus forming a triangle, and reinforcing the corner connector 10. Referring now to FIG. 6, a sawtooth structure 46 on right and left upper corner connectors 10 serves to suspend the assembled picture frame on a wall or similar supporting vertical environmental surface. Adjustment for leveling is provided by the many notches 48 provided by the sawtooth structure 46. Nails 50, or any essentially rodlike mounting driven into the wall engage the notches 48. The picture frame is leveled by selection of appropriate grooves 48 engaging the nails 50. In this manner, a wire conventionally attached to a prior art picture frame to suspend the prior art picture frame on a nail is rendered unnecessary.

The picture frame channel 12 is easily removed by releasing the locking arm 18. The locking arm 18 is accessible through a substantial opening 40 extending from the front to the rear of the corner connector 10 between the three legs 14,14,38. A user pushes locking arm 18 in the same direction in which the picture frame channel 12 was originally inserted into the corner connector 10. The locking arm 18 is thus moved out of engagement with the picture frame channel 12, and the picture frame channel 12 is now easily removed.

Figure 3:
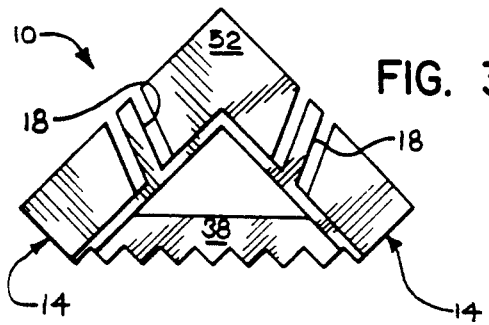
FIG. 3 is a front top plan view of an alternative embodiment corner connector wherein a locking arm faces outwardly.

In an alternative embodiment shown in FIG. 3, the corner connector 10 is formed with the locking arm 18 pointing outwardly, away from the open interior of the triangle.

Figure 4:
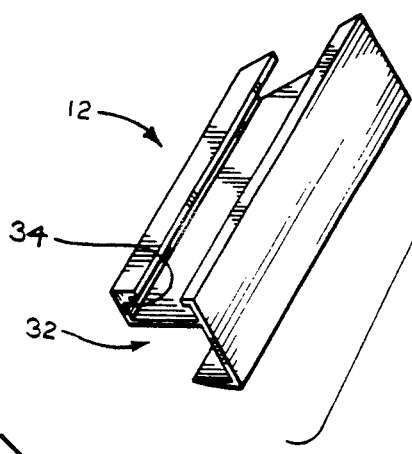
FIG. 4 is a front top plan view of an alternative embodiment corner connector wherein each frame channel is gripped by plural locking arms.
Figure 4:
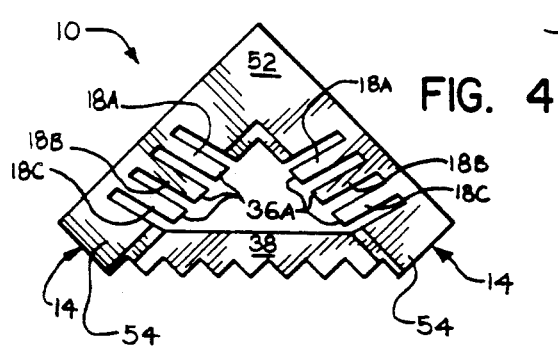
Figure 5:
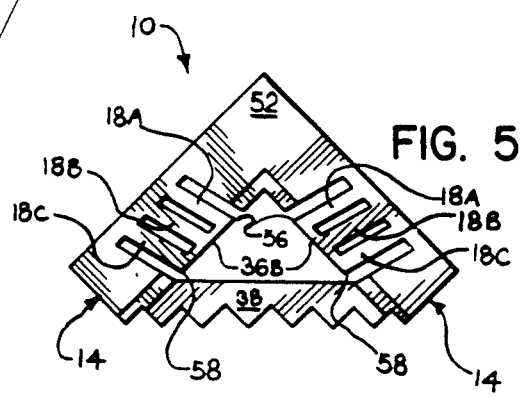
FIG. 5 is a front top plan view of an alternative embodiment corner connector wherein plural locking arms are yoked.

Another alternative embodiment is shown in FIG. 4, wherein corner connector 10 has three locking arms 18A,18B,18C disposed on each leg 14. In a still further, but related alternative embodiment, shown in FIG. 5, locking arms 18A,18B,18C are yoked or connected. A corner of the triangle wherein legs 14 meet at a right angle will be designated the inside corner 52, and the corner including a joint between either leg 14 and leg will be designated an outside corner 54, and other components will be described with reference to proximity to relative inner or outer locations thereof. An elongated locking arm end surface 36B is thus formed which extends from an innermost edge 56 of an inner locking arm 18A to an outermost edge 58 of an outer locking arm 18C. Increased frictional grip on a picture frame channel 12 is thus enabled, while deflection of each individual locking arm 18A,18B or 18C is accommodated by space separating locking arms 18A,18B,18C.

As seen in FIG. 6, picture frame assembly is formed using four corner connectors 10 and four frame channels 12. Only two top corner connectors 10 are shown, lower corresponding corner connectors being omitted and associated picture frame channels 12 being truncated or omitted. Each corner connector 10 holds two adjacent picture frame channels 12 in tight abutment. The present invention 10 thus provides means of solidly yet releasably locking a picture frame assembly together, and provides means of attachment to a wall. Both assembly and disassembly are readily performed either manually or with a simple tool, such as a common screwdriver.

It is to be understood that the present invention is not limited to the embodiments described above, but encompasses any and all embodiments within the scope of the following claims.

I claim:

1. For use with conventional picture frame channels being assembled to form a picture frame, a picture frame corner connector having means engagingly to retain two frame channels in tight abutment at an angle to one another, said means engagingly retaining the two frame channels comprising:

means defining groove means for engaging each of the two frame channels;

said groove means defining leg means;

said leg means further defining a triangle;

said triangle having first and second legs;

said first and second legs having common proximal ends, separated distal ends, and defining an angle between said first and second legs;

two resiliently biased locking members;

each one of said biased members being disposed upon one of said first and second legs;

each one of said biased members further being resiliently biased to frictionally engage one of the two frame channels, thereby to lock the two frame channels in place within said corner connector solely by friction;

a third leg spanning said first and second leg distal ends; and an opening extending through said corner connector being defined by said first, second and third legs, whereby said biased locking members are accessible so as to be moved to release the two frame channels.

2. The corner connector according to claim 1, said third leg further including sawtooth projections disposed thereon, whereby each said corner connector used in a picture frame assembly is adjustably suspended from an essentially rodlike mounting projecting from a vertical environmental surface.

3. The corner connector according to claim 1, said corner connector having an interior defined between said legs of said triangle, said biased locking members having proximal and distal ends, said biased locking members connecting to said corner connector at said proximal ends, and said distal ends terminating at and facing said interior.

4. The corner connector according to claim 1, wherein said biased locking members points outwardly.

5. The corner connector according to claim 1, there being more than one said biased locking member disposed upon each of said first and second legs of said triangle;

a first biased locking member being located nearer to said proximal end of said legs of said triangle;

said first biased locking member having a proximal edge;

a second biased locking member being located nearer to said distal end of its respective leg of said triangle; and said second biased locking member having a distal edge, there being a dimension spanning said locking member proximal and distal edges.

6. The corner connector according to claim 5, further including first means connecting and spanning all said biased locking members disposed upon said first legs of said triangle;

said first connecting means defining a surface having a length at least as great as said dimension spanning said locking member proximal and distal edges;

second means connecting and spanning all said biased locking members disposed upon said second leg of said triangle; and said second connecting means defining a second surface having a length at least as great as said dimension spanning said locking member proximal and distal edges, whereby each frame channel can be frictionally contacted and retained along a length of channel equal to said length of one of said connecting means spanning surfaces.

7. A picture frame assembly including:

at least two corner connectors;

a plurality of picture frame channels;

each one of said corner connectors having means engagingly to retain two of said frame channels in tight abutment at an angle to one another;

said means engagingly retaining said frame channels comprising:

means defining grooves for engaging each of said frame channels;

said groove means defining leg means;

said leg means further defining a triangle;

said triangle having first and second legs;

said first and second legs having common proximal ends, separated distal ends, and defining an angle between said first and second legs;

two resiliently biased locking members;

each one of said biased members being disposed upon one of said first and second legs of said triangle;

each one of said biased members further being resiliently biased to frictionally engage one of said frame channels, thereby to lock said frame channels in place within said corner connector solely by friction;

a third leg spanning said first and second leg distal ends;

an opening extending through said corner connector being defined by said first, second and third legs, whereby said biased locking members are accessible so as to be moved to release said frame channels and;

said plurality of picture frame channels being secured in said picture frame assembly by said corner connectors, whereby said picture frame assembly is supported on and is adjustably leveled on essentially rodlike mountings projecting from a vertical environmental surface.

* * * * *